United States Patent
Chen

(10) Patent No.: US 10,806,004 B2
(45) Date of Patent: Oct. 13, 2020

(54) LIGHT-EMITTING DEVICE AND DRIVING DEVICE THEREOF

(71) Applicant: Industrial Technology Research Institute, Hsinchu (TW)

(72) Inventor: Yuan-Ching Chen, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 54 days.

(21) Appl. No.: 16/231,624

(22) Filed: Dec. 24, 2018

(65) Prior Publication Data

US 2019/0246464 A1    Aug. 8, 2019

Related U.S. Application Data

(60) Provisional application No. 62/627,774, filed on Feb. 8, 2018.

(30) Foreign Application Priority Data

Oct. 31, 2018    (TW) .............................. 107138525 A

(51) Int. Cl.
*H05B 45/10*    (2020.01)
*H05B 45/37*    (2020.01)
*H05B 45/35*    (2020.01)

(52) U.S. Cl.
CPC ............. *H05B 45/37* (2020.01); *H05B 45/10* (2020.01)

(58) Field of Classification Search
CPC ........................... H04B 10/502; H04B 10/116
See application file for complete search history.

(56) References Cited

U.S. PATENT DOCUMENTS

| | | | | |
|---|---|---|---|---|
| 8,917,035 | B2 * | 12/2014 | Zhang | H05B 37/02 315/209 R |
| 9,294,189 | B2 | 3/2016 | Kido et al. | |
| 2012/0153844 | A1 * | 6/2012 | Chobot | H05B 33/083 315/185 R |
| 2014/0133866 | A1 | 5/2014 | Liu et al. | |
| 2015/0098708 | A1 | 4/2015 | Kido et al. | |
| 2016/0094291 | A1 * | 3/2016 | Lai | H04B 10/116 398/118 |

FOREIGN PATENT DOCUMENTS

| | | |
|---|---|---|
| CN | 103368647 | 10/2013 |
| TW | I600286 | 9/2017 |

* cited by examiner

*Primary Examiner* — Henry Luong
(74) *Attorney, Agent, or Firm* — JCIPRNET

(57) ABSTRACT

A light-emitting device and a driving device thereof. The driving device is coupled to a load and includes a first current source and a second current source. The first current source provides a base current to drive the load. The second current source generates an adjustment current according to an adjustment voltage and enables the adjustment current to adjust magnitude of a current flowing through the load.

6 Claims, 7 Drawing Sheets

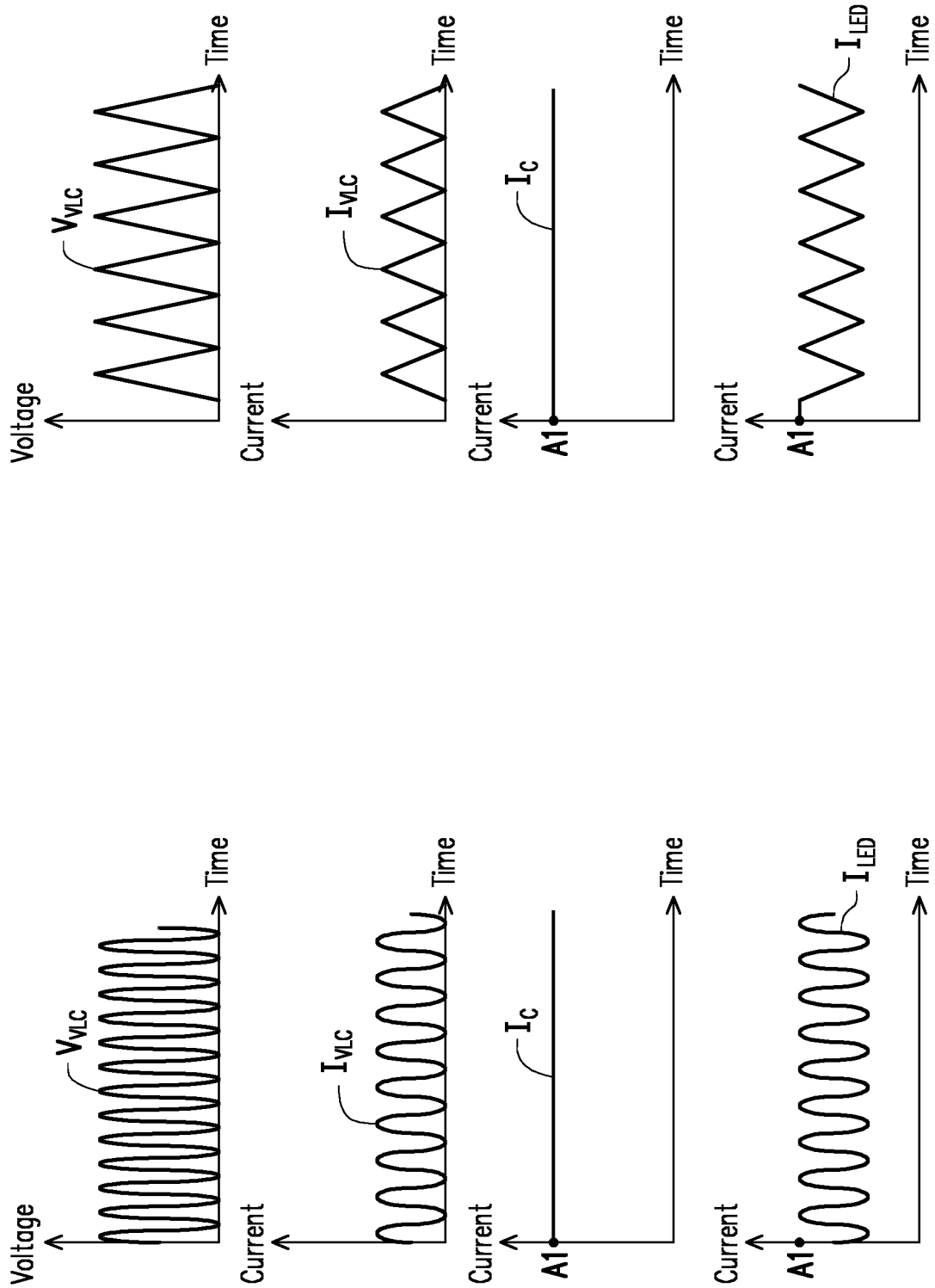

LIGHT-EMITTING DEVICE AND DRIVING DEVICE THEREOF

CROSS-REFERENCE TO RELATED APPLICATION

This application claims the priority benefits of U.S. provisional application Ser. No. 62/627,774, filed on Feb. 8, 2018 and Taiwan application Ser. No. 107138525, filed on Oct. 31, 2018. The entirety of each of the above-mentioned patent applications is hereby incorporated by reference herein and made a part of this specification.

BACKGROUND

Technical Field

The disclosure relates to a driving device. More particularly, the disclosure relates to a driving device for a light-emitting device.

Description of Related Art

Nowadays, applications of various types of solid-state light-emitting elements have gradually expanded, and light emitting diodes (LEDs) are now widely adopted as light-emitting sources for light-source modules in panels, lighting devices in daily life, indication lights used in the public areas and the like. Besides, along with rapid development of communication technology, the various solid-state light-emitting elements are also applied to wireless signal transmission. The light emitting diodes used for lighting may particularly be applied to the visible light communication (VLC) technology.

Nevertheless, in the related art, the light communication driving devices configured to drive the light-emitting elements are limited in terms of, for example, light-emitting power, modulation speed, modulation waveform, circuit complexity, volume and so on. Therefore, how a driving device can be designed to overcome the foregoing limitations is an important issue for people having ordinary skill in the art.

SUMMARY

The disclosure provides a light-emitting device and a driving device thereof capable of dynamically adjusting a current flowing through a load.

The disclosure provides a driving device. The driving device is coupled to a load. The driving device includes a first current source and a second current source. The first current source provides a base current to drive the load. The second current source generates an adjustment current according to an adjustment voltage and enables the adjustment current to adjust magnitude of a current flowing through the load.

The disclosure further provides a light source device including a light-emitting element and a driving device as described above. The driving device as described above is coupled to the light-emitting element.

To sum up, the disclosure provides the second current source to generate the adjustment current according to the adjustment voltage and to adjust magnitude of a current flowing through the load through the adjustment current. In this way, a working speed of the driving device in the disclosure is not limited by a working speed of the first current source configured to generate a major driving current, and performance of a driving circuit is therefore effectively increased.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 4A to FIG. 4C are schematic diagrams illustrating signals according to an exemplary embodiment of the disclosure.

DESCRIPTION OF THE EMBODIMENTS

Figure 1:
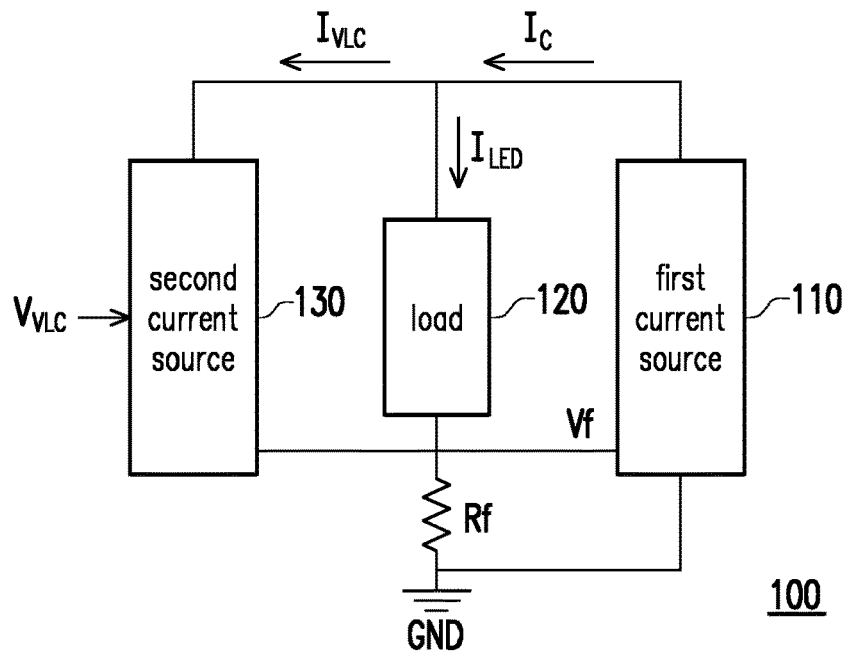
FIG. 1 is a block diagram illustrating a driving device according to an exemplary embodiment of the disclosure.

FIG. 1 is a block diagram illustrating a driving device according to an exemplary embodiment of the disclosure. With reference to FIG. 1, a driving device 100 includes a first current source 110, a load 120, a second current source 130, and a current-sensing resistor Rf. A first end of the first current source 110 and a first end of the second current source 130 are coupled to a first end of the load 120 together, and a second end of the first current source 110 is coupled to a reference grounding end GND. A second end of the load 120 and a second end of the second current source 130 are coupled to a feedback end of the first current source 110 together. The current-sensing resistor Rf is coupled between the load 120 and the reference grounding end GND. A load current $I_{LED}$ flows through the current-sensing resistor Rf to generate a feedback voltage Vf. The first current source 110 may provide a base current $I_C$ at the first end according to the feedback voltage Vf. The second current source 130 may derive an adjustment current $I_{VLC}$ with the base current $I_C$ through the first end of the second current source 130 and enables magnitude of the load current $I_{LED}$ flowing through the load 120 to be equal to magnitude of the base current $I_C$ minus magnitude of the adjustment current $I_{VLC}$. Further, the second current source 130 may receive an adjustment voltage $V_{VLC}$ and generates the adjustment current $I_{VLC}$ according to the adjustment voltage $V_{VLC}$. Accordingly, the driving device 100 may derive the adjustment current $I_{VLC}$ with the base current $I_C$ according to the adjustment voltage $V_{VLC}$, so as to further adjust the magnitude of the load current $I_{LED}$ flowing through the load 120.

In this embodiment, the adjustment voltage $V_{VLC}$ may be directly proportional to or inversely proportional to the adjustment current $I_{VLC}$. For instance, if the adjustment voltage $V_{VLC}$ is inversely proportional to the adjustment current $I_{VLC}$, the adjustment voltage $V_{VLC}$ may be directly proportional to the load current $I_{LED}$. In this embodiment, when the adjustment voltage $V_{VLC}$ is turned up, the adjustment current $I_{VLC}$ derived by the second current source 130 with the base current $I_C$ is turned down, and the load current $I_{LED}$ flowing through the load 120 is turned up. Conversely, when the adjustment voltage $V_{VLC}$ is turned down, the adjustment current $I_{VLC}$ derived by the second current source 130 with the base current $I_C$ is turned up, and the load current $I_{LED}$ flowing through the load 120 is turned down.

In other embodiments of the disclosure, the adjustment voltage $V_{VLC}$ may be directly proportional to the adjustment current $I_{VLC}$, and the adjustment voltage $V_{VLC}$ may be inversely proportional to the load current $I_{LED}$. In this embodiment, when the adjustment voltage $V_{VLC}$ is turned up, the adjustment current $I_{VLC}$ derived by the second current source 130 with the base current $I_C$ is turned up, and the load current $I_{LED}$ flowing through the load 120 is turned down. Conversely, when the adjustment voltage $V_{VLC}$ is turned down, the adjustment current $I_{VLC}$ derived by the second current source 130 with the base current $I_C$ is turned down, and the load current $I_{LED}$ flowing through the load 120 is turned up.

Through the driving device 100, in the exemplary embodiments of the disclosure, a voltage value of the adjustment voltage $V_{VLC}$ may be dynamically controlled, so as to control how much adjustment current $I_{VLC}$ is to be derived with the base current $I_C$ and to further control magnitude of a current flowing through the load 120. For instance, the driving device 100 may correspondingly generate the load current $I_{LED}$ which varies periodically to drive the load 120 through the voltage value of the adjustment voltage $V_{VLC}$ which adjusts periodically. Herein, a switching frequency of the base current $I_C$ is lower than a switching frequency of the adjustment voltage $V_{VLC}$. Besides, the driving device 100 may feature a simple structure and thus may be easily integrated during circuit integration.

Note that the load 120 may be a light-emitting element, and the light-emitting element may comprise one or more than one light emitting diodes. Herein, the plural light emitting diodes may be connected in series, connected in parallel, or combined through being connected in series and in parallel to constitute the light-emitting element, and how the light-emitting element is formed is not particularly limited. Therefore, the light-emitting element may be driven through the driving device 100, and the voltage value of the adjustment voltage $V_{VLC}$ may be dynamically adjusted to enable the light-emitting element to generate a light signal which varies periodically. Accordingly, general electric signals may be converted into light signals to be applied to a variety of optical communication equipment. Herein, the light signals feature a directive property, information security, and other advantages, and further, the light signals are immune to electromagnetic interference, require no frequency band license, and can provide indoor lighting as well.

Figure 2:
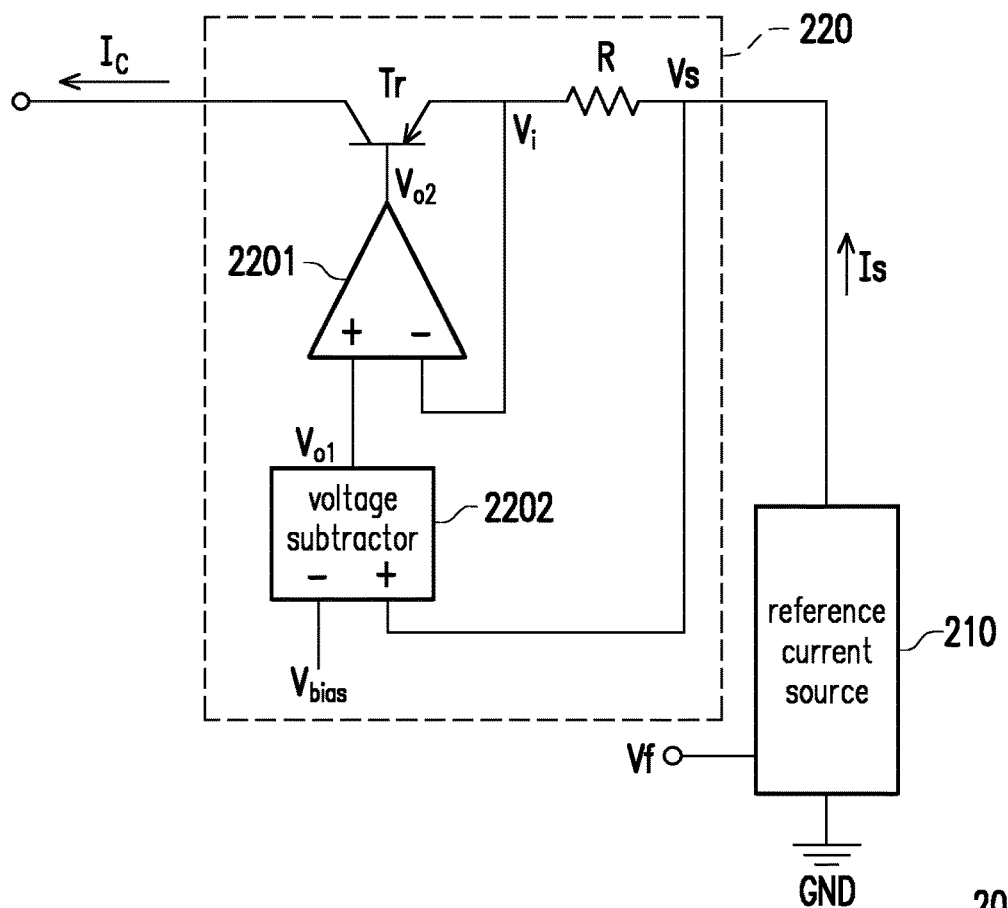
FIG. 2 is a schematic diagram illustrating a first current source according to an exemplary embodiment of the disclosure.

FIG. 2 is a schematic diagram illustrating a first current source according to an exemplary embodiment of the disclosure. With reference to FIG. 2, a first current source 200 includes a reference current source 210 and a voltage-to-current converting circuit 220. A second end of the reference current source 210 is coupled to the reference grounding end GND, a feedback end of the reference current source 210 is configured to receive the feedback voltage Vf, and a first end of the reference current source 210 may generate a reference current Is according to the feedback voltage Vf. The voltage-to-current converting circuit 220 is coupled to the reference current source 210 and receives the reference current Is. The voltage-to-current converting circuit 220 generates a reference voltage Vs according to the reference current Is and generates the base current $I_C$ according to a bias voltage $V_{bias}$ and the reference voltage Vs.

To be specific, the voltage-to-current converting circuit 220 includes a resistor R, a transistor Tr, an operational amplifier 2201, and a voltage subtractor 2202. The resistor R is connected in series between the first end of the reference current source 210 and a negative input end of the operational amplifier 2201. A positive input end of the voltage subtractor 2202 is coupled to the first end of the reference current source 210, and an output end of the voltage subtractor 2202 is coupled to a positive input end of the operational amplifier 2201. Herein, a negative input end of the voltage subtractor 2202 is configured to receive the bias voltage $V_{bias}$. A control end of the transistor Tr is coupled to an output end of the operational amplifier 2201, a first end of the transistor Tr is coupled to the negative input end of the operational amplifier 2201, and a second end of the transistor Tr is configured to output the base current $I_C$.

Specifically, as the resistor R is enabled to receive the reference current Is, the positive input end of the voltage subtractor 2202 may generate the reference voltage Vs, and the voltage subtractor 2202 enables the reference voltage Vs and the bias voltage $V_{bias}$ to perform subtraction to generate a voltage $V_{o1}$. In addition, as the reference current Is is enabled to flow through the resistor R, the negative input end of the operational amplifier 2201 and the first end of the transistor Tr may generate a voltage $V_i$. Herein, a resistance value of the resistor R is exemplified as being 1 ohm, and a voltage value of the voltage $V_i$ may be equal to Vs−Is. The operational amplifier 2201 generates an output voltage $V_{o2}$ to the control end of the transistor Tr according to the voltage $V_{o1}$ and the voltage $V_i$. The transistor Tr generates the base current $I_C$ at the second end of the transistor Tr according to the output voltage $V_{o2}$. Herein, a current value of the base current $I_C$ may be equal to a current value of the reference current Is.

In the embodiments of the disclosure, the transistor Tr may be a PNP-type bipolar junction transistor (BJT) or a P-type field-effect transistor (FET) and is not particularly limited.

Figure 3:
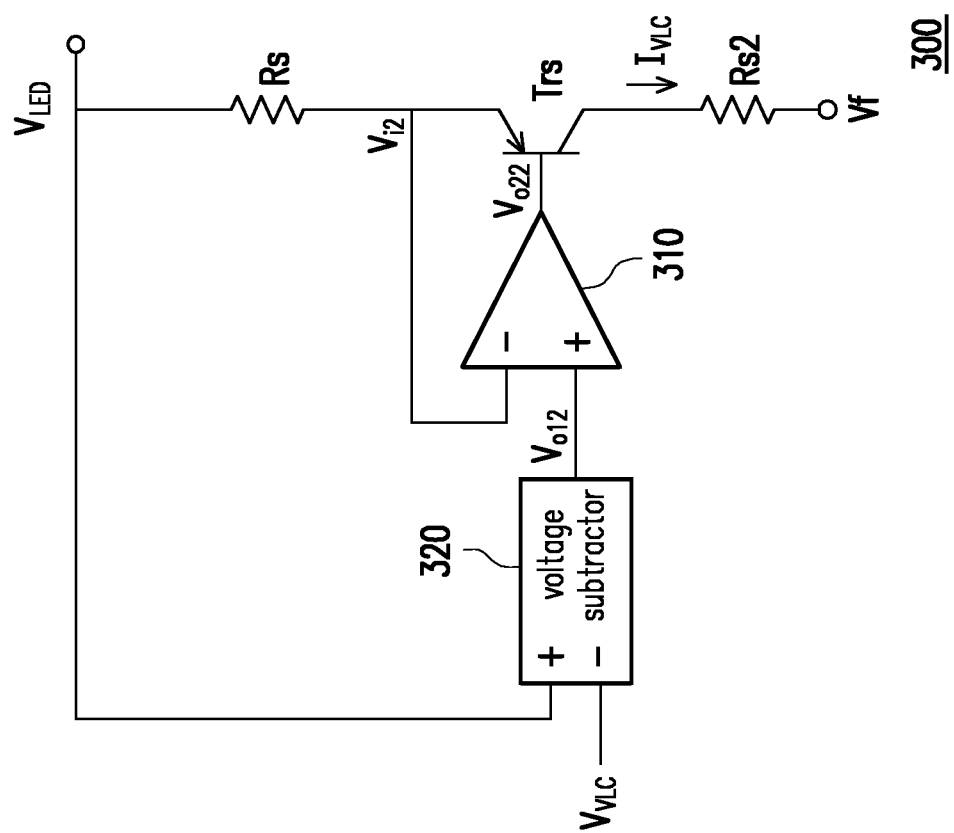
FIG. 3 is a schematic diagram illustrating a second current source according to an exemplary embodiment of the disclosure.

FIG. 3 is a schematic diagram illustrating a second current source according to an exemplary embodiment of the disclosure. With reference to FIG. 3, a second current source 300 includes a resistor Rs, a resistor Rs2, a transistor Trs, an operational amplifier 310, and a voltage subtractor 320. The resistor Rs is coupled between a negative input end of the operational amplifier 310 and a positive input end of the voltage subtractor 320. An output end of the voltage subtractor 320 is coupled to a positive input end of the operational amplifier 310. Herein, the positive input end of the voltage subtractor 320 is configured to receive a load voltage $V_{LED}$, and a negative input end of the voltage subtractor 320 is configured to receive the adjustment voltage $V_{VLC}$. A control end of the transistor Trs is coupled to an output end of the operational amplifier 310, a first end of the transistor Trs is coupled to the negative input end of the operational amplifier 310, and the resistor Rs2 is coupled between a second end of the transistor Trs and the feedback voltage Vf.

Specifically, the voltage subtractor 320 enables the load voltage $V_{LED}$ and the adjustment voltage $V_{VLC}$ to perform subtraction to generate a voltage $V_{o12}$. The operational amplifier 310 generates an output voltage $V_{o22}$ to the control end of the transistor Trs according to the voltage $V_{o12}$ and the voltage $V_{i2}$. The transistor Trs generates the adjustment current $I_{VLC}$ at the second end of the transistor Trs according to the output voltage $V_{o22}$. Herein, a current value of the adjustment current $I_{VLC}$ may be equal to a current value of a current generated according to two ends, the load voltage $V_{LED}$ and the voltage $V_{i2}$, of the resistor Rs. For instance, the current value of the adjustment current $I_{VLC}$ may be equal to $(V_{LED}-V_{VLC})/Rs$.

Note that the transistor Trs may be a PNP-type bipolar junction transistor or a P-type field-effect transistor. In addition, the adjustment voltage $V_{VLC}$ may be a voltage which modulates periodically or may be adapted to any form of modulation (e.g., the pulse width modulation, pulse position modulation, pulse amplitude modulation, orthogonal amplitude modulation, etc.), and a specification of the transistor Trs may be set according to a frequency of the adjustment voltage $V_{VLC}$.

Figure 4A:
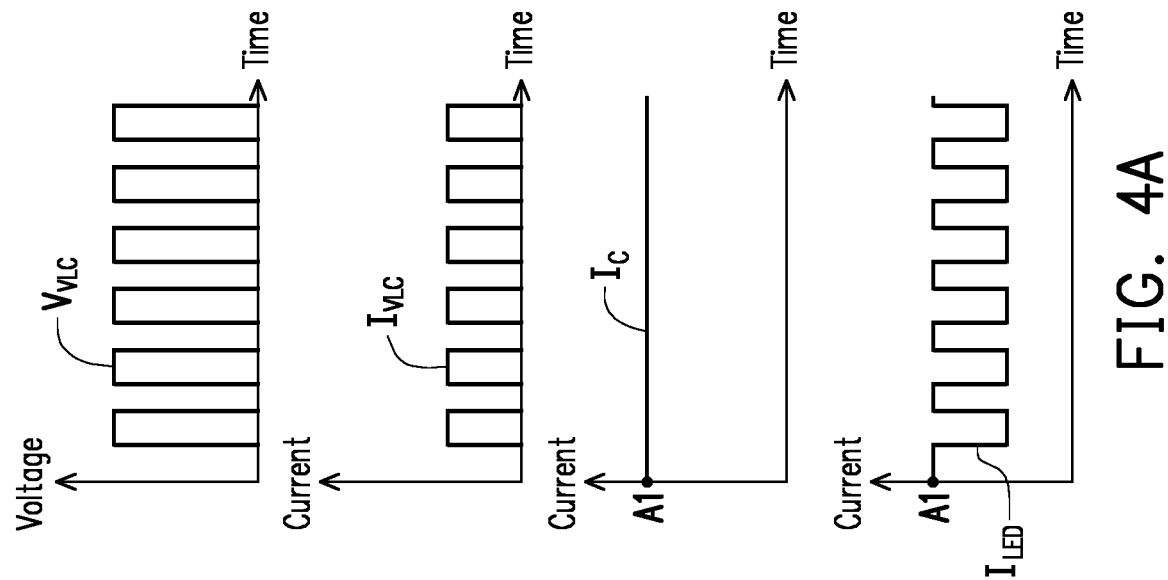

With reference to FIG. 1 and FIG. 4A to FIG. 4C together for detailed implementation of the adjustment voltage $V_{VLC}$, FIG. 4A to FIG. 4C are schematic diagrams illustrating signals according to an exemplary embodiment of the disclosure. In FIG. 4A, the adjustment voltage $V_{VLC}$ is a pulse modulation signal, the base current $I_C$ is a direct current (equal to a current value A1), and the adjustment current $I_{VLC}$ is a current having a periodic square wave. The base current $I_C$ derives the adjustment current $I_{VLC}$, so that the generated load current $I_{LED}$ is a current having a periodic square wave as well. Further, a current value of the load current $I_{LED}$ may be equal to the current value of the base current $I_C$ minus the current value of the adjustment current $I_{VLC}$.

In FIG. 4B, the adjustment voltage $V_{VLC}$ is a sinusoidal wave signal, the base current $I_C$ is a direct current (equal to the current value A1), and the adjustment current $I_{VLC}$ is a current having a periodic sinusoidal wave. The base current $I_C$ derives the adjustment current $I_{VLC}$, so that the generated load current $I_{LED}$ is a current having a periodic sinusoidal wave as well. Further, the current value of the load current $I_{LED}$ may be equal to the current value of the base current $I_C$ minus the current value of the adjustment current $I_{VLC}$ (a current value of a peak is A1). In FIG. 4C, the adjustment voltage $V_{VLC}$ is a triangular wave signal, the base current $I_C$ is a direct current (equal to the current value A1), and the adjustment current $I_{VLC}$ is a current having a periodic triangular wave. The base current $I_C$ derives the adjustment current $I_{VLC}$, so that the generated load current $I_{LED}$ is a current having a periodic triangular wave as well. Further, the current value of the load current $I_{LED}$ may be equal to the current value of the base current $I_C$ minus the current value of the adjustment current $I_{VLC}$.

Figures 5A, 5B:
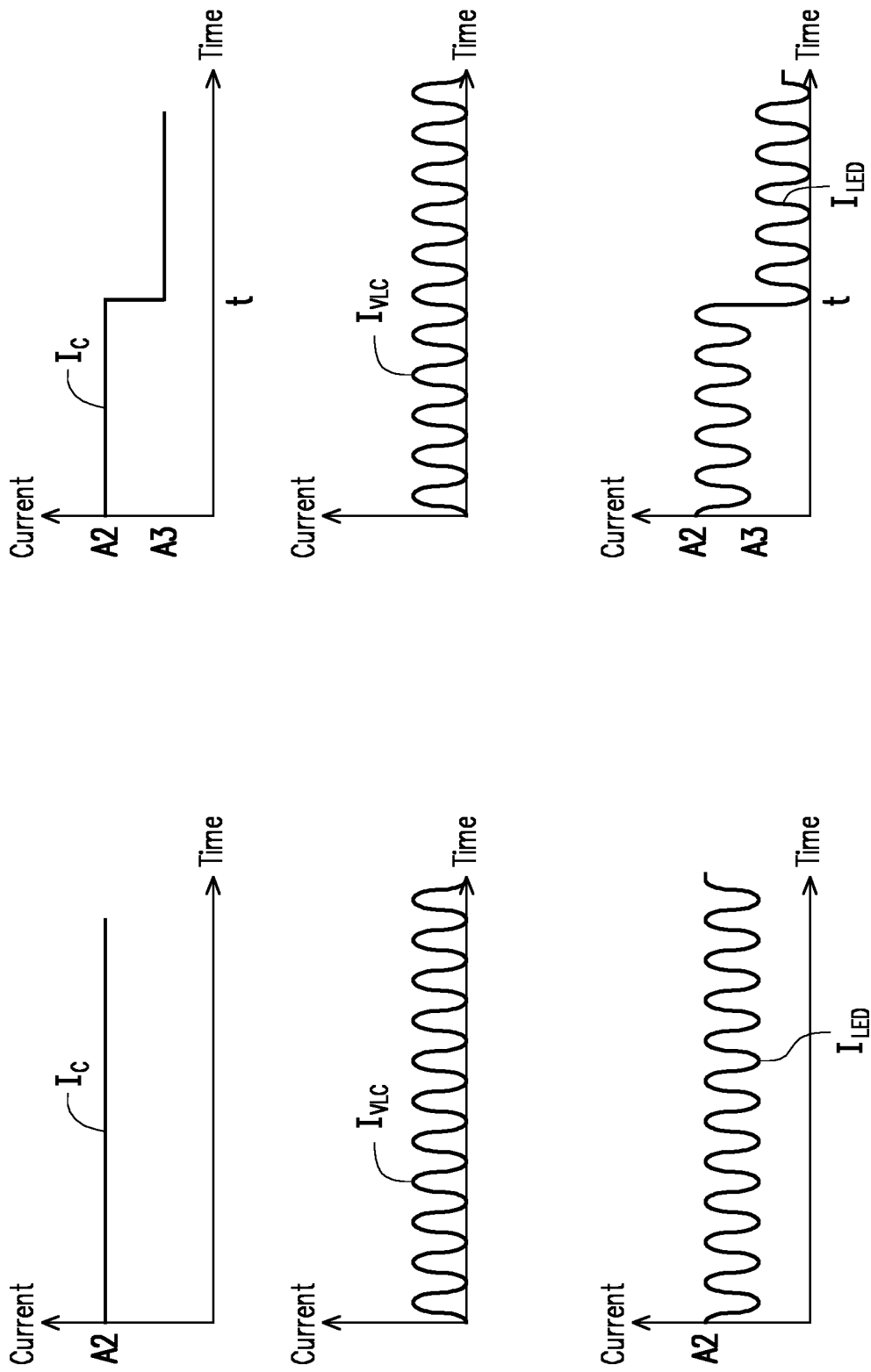
FIG. 5A and FIG. 5B are schematic diagrams illustrating signals according to an exemplary embodiment of the disclosure.

With reference to FIG. 1 and FIG. 5A to FIG. 5B together for detailed implementation of the adjustment voltage $I_{VLC}$, in FIG. 5A, the base current $I_C$ is a direct current (equal to a current value A2), and the adjustment current $I_{VLC}$ is a current having a periodic sinusoidal wave. The base current $I_C$ derives the adjustment current $I_{VLC}$, so that the generated load current $I_{LED}$ is a current having a periodic sinusoidal wave. Further, the current value of the load current $I_{LED}$ may be equal to the current value of the base current $I_C$ minus the current value of the adjustment current $I_{VLC}$. In FIG. 5B, the base current $I_C$ is a current having a periodic square wave (the current value of the base current $I_C$ varies between A2 and A3, and a half period of the base current $I_C$ is t), and the adjustment current $I_{VLC}$ is a current having a periodic sinusoidal wave. The base current $I_C$ derives the adjustment current $I_{VLC}$, so that the generated load current $I_{LED}$ is a current having a periodic sinusoidal wave and has a peak value which changes according to the base current $I_C$. Further, the current value of the load current $I_{LED}$ may be equal to the current value of the base current $I_C$ minus the current value of the adjustment current $I_{VLC}$.

Figure 6:
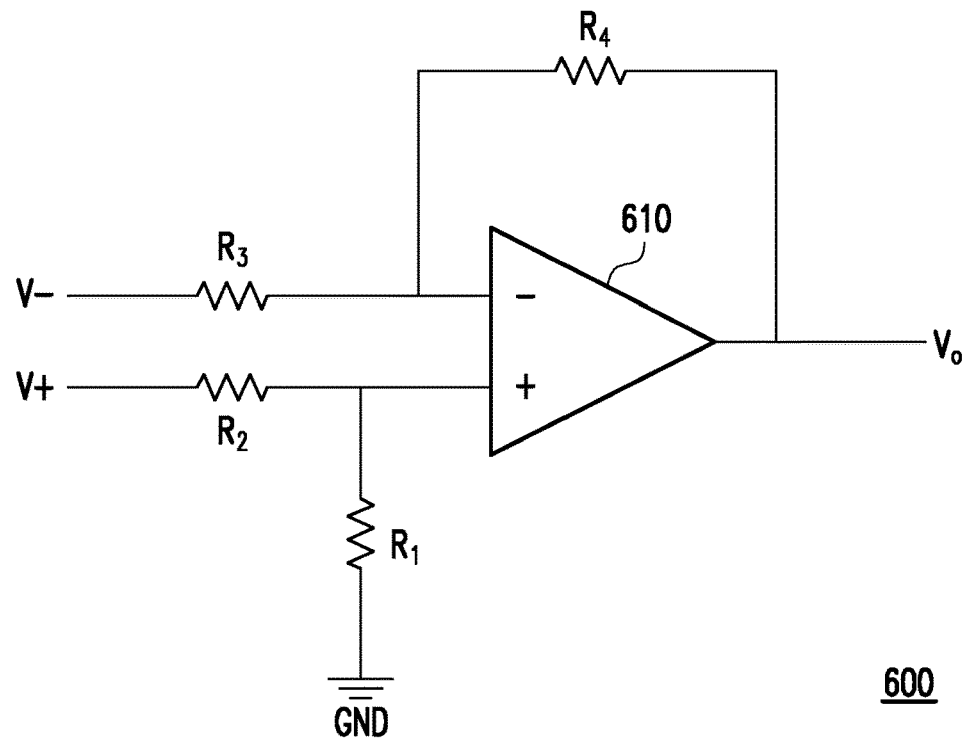
FIG. 6 is a schematic diagram illustrating a voltage subtractor according to an exemplary embodiment of the disclosure.

FIG. 6 is a schematic diagram illustrating a voltage subtractor according to an exemplary embodiment of the disclosure. With reference to FIG. 6, a voltage subtractor 600 includes an operational amplifier 610 and a plurality of resistors $R_1$ to $R_4$. The resistor $R_1$ is coupled between a positive input end of the operational amplifier and the reference grounding end GND. The resistor $R_2$ is coupled to the positive input end of the operational amplifier 610 and the resistor $R_1$. The resistor $R_3$ is coupled to a negative input end of the operational amplifier 610. The resistor $R_4$ is coupled between the negative input end of the operational amplifier 610 and an output end of the operational amplifier 610. The positive input end of the operational amplifier 610 may receive an input voltage V+ through the resistor $R_2$, and the negative input end of the operational amplifier 610 may receive an input voltage V− through the resistor $R_3$. The voltage subtractor 600 may then generate a voltage $V_o$ according to the input voltage V+ and the input voltage V−. Under the condition that resistance values of the resistors $R_1$ to $R_4$ are identical, the voltage $V_o$=input voltage V+ minus input voltage V−.

Figure 7:
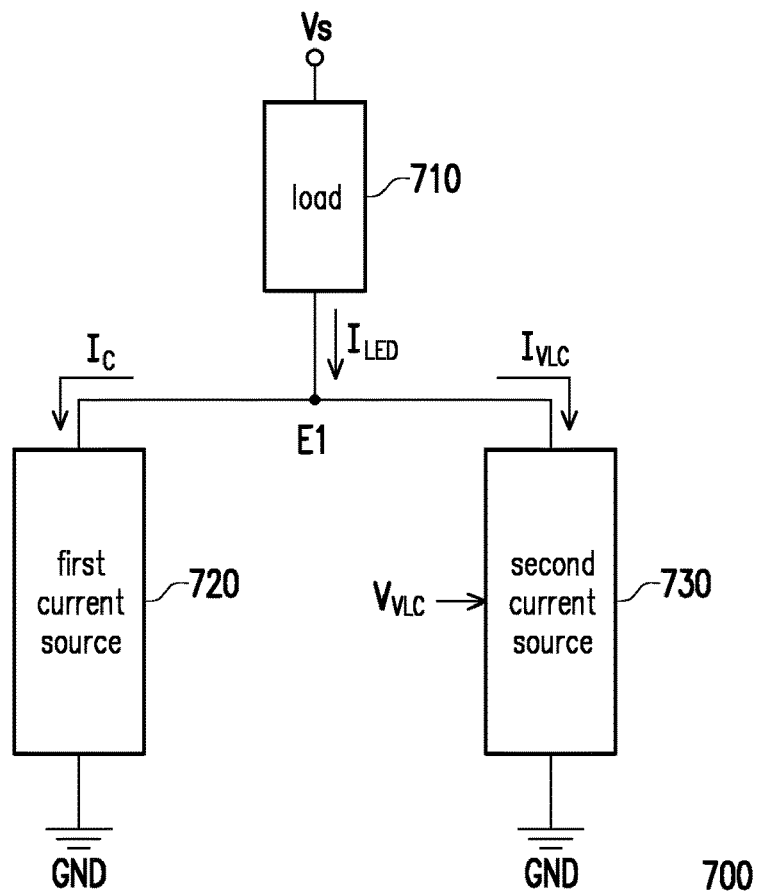
FIG. 7 is a block diagram illustrating a driving device according to another exemplary embodiment of the disclosure.

FIG. 7 is a block diagram illustrating a driving device according to another exemplary embodiment of the disclosure. With reference to FIG. 7, a driving device 700 includes a load 710, a first current source 720, and a second current source 730. A first end of the load 710 receives the reference voltage Vs, and a second end of the load 710 is coupled to a first end of the first current source 720 and a first end of the second current source 730. A second end of the first current source 720 and a second end of the second current source 730 are coupled to the reference grounding end GND together. The first current source 720 and the second current source 730 may respectively generate the base current $I_C$ and the adjustment current $I_{VLC}$. The base current $I_C$ and the adjustment current $I_{VLC}$ respectively generated by the first current source 720 and the second current source 730 are combined and flow through the load 710, so that magnitude of a current flowing through the load 710 is equal to the magnitude of the base current $I_C$ plus the magnitude of the adjustment current $I_{VLC}$ (the load current $I_{LED}$ is split into the base current $I_C$ and the adjustment current $I_{VLC}$ at a node E1). Further, the second current source 730 may receive the adjustment voltage $V_{VLC}$ and generates the adjustment current $I_{VLC}$ according to the adjustment voltage $V_{VLC}$. Accordingly, the driving device 700 may adjust a current value combining the current value of the base current $I_C$ and the current value of the adjustment current $I_{VLC}$, so as to further adjust the load current $I_{LED}$ flowing through the load 710.

Through the driving device 700, in the embodiments of the disclosure, the voltage value of the adjustment voltage $V_{VLC}$ may be dynamically controlled, so as to control the current value combining the current value of the base current $I_C$ and the current value of the adjustment current $I_{VLC}$ and to further control magnitude of a current flowing through the load 710. For instance, the driving device 700 may correspondingly generate the load current $I_{LED}$ which varies periodically to drive the load 710 through the voltage value of the adjustment voltage $V_{VLC}$ which adjusts periodically. Herein, the switching frequency of the base current $I_C$ is lower than the switching frequency of the adjustment voltage $V_{VLC}$. Based on the above description, it can be seen that the driving device 700 of this embodiment features a simple circuit structure and may be easily integrated during circuit integration.

Figure 8:
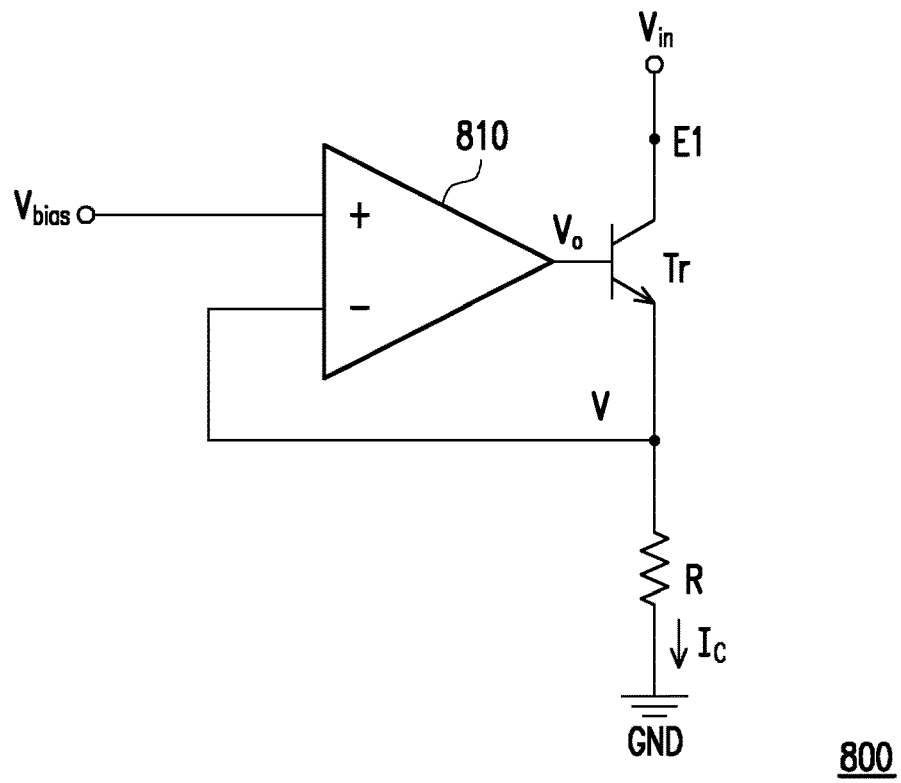
FIG. 8 is a schematic diagram illustrating a first current source according to an exemplary embodiment of the disclosure.

FIG. 8 is a schematic diagram illustrating a first current source according to an exemplary embodiment of the disclosure. With reference to FIG. 8, a first current source 800 includes a resistor R, a transistor Tr, and an operational amplifier 810. A negative input end of the operational amplifier 810 is coupled to the reference grounding end GND through the resistor R, and a positive input end of the operational amplifier 810 is configured to receive the bias voltage $V_{bias}$. A control end of the transistor Tr is coupled to an output end of the operational amplifier 810, a first end (i.e., an end E1) of the transistor Tr is configured to receive a reference voltage $V_{in}$, and a second end of the transistor Tr is coupled to the negative input end of the operational amplifier 810.

Specifically, the operational amplifier 810 generates one output voltage Vo to the control end of the transistor Tr according to the bias voltage $V_{bias}$ and a feedback signal V. The transistor Tr generates the base current $I_C$ to flow through the resistor R at the second end of the transistor Tr according to the output voltage $V_o$. Herein, a current value of a current flowing through the resistor R is equal to a voltage value of the feedback signal V divided by a resistance value of the resistor R. In operation, the voltage value of the feedback signal V is substantially equal to a voltage value of the bias voltage $V_{bias}$, and the current value of the base current $I_C$ may be equal to $V_{bias}/R$.

Note that the transistor Tr may be a NPN-type bipolar junction transistor or an N-type field-effect transistor.

Figure 9:
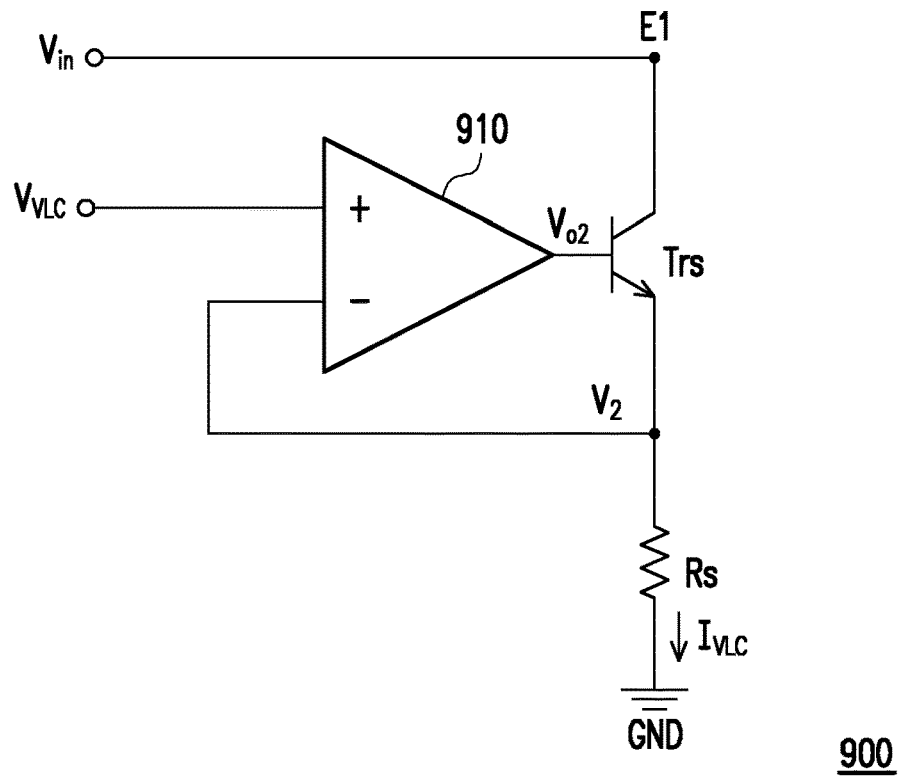
FIG. 9 is a schematic diagram illustrating a second current source according to an exemplary embodiment of the disclosure.

FIG. 9 is a schematic diagram illustrating a second current source according to an exemplary embodiment of the disclosure. With reference to FIG. 9, a second current source 900 includes a resistor Rs, a transistor Trs, and an operational amplifier 910. A negative input end of the operational amplifier 910 is coupled to the reference grounding end GND through the resistor Rs, and a positive input end of the operational amplifier 910 is configured to receive the adjustment voltage $V_{VLC}$. A control end of the transistor Trs is coupled to an output end of the operational amplifier 910, a first end (i.e., the end E1) of the transistor Trs is configured to receive the reference voltage $V_{in}$, and a second end of the transistor Trs is coupled to the negative input end of the operational amplifier 910.

Specifically, the operational amplifier 910 generates one output voltage $V_{o2}$ to the control end of the transistor Trs according to the adjustment voltage $V_{VLC}$ and a feedback signal $V_2$. The transistor Trs generates the adjustment current $I_{VLC}$ to flow through the resistor Rs at the second end of the transistor Trs according to the output voltage $V_{o2}$. Herein, the current value of the adjustment current $I_{VLC}$ is equal to a voltage value of the feedback signal $V_2$ divided by a resistance value of the resistor Rs. In operation, the voltage value of the feedback signal $V_2$ is substantially equal to the voltage value of the adjustment voltage $V_{VLC}$, and the current value of the adjustment current $I_{VLC}$ may be equal to $V_{VLC}/Rs$.

Note that the transistor Trs may be a NPN-type bipolar junction transistor or an N-type field-effect transistor.

Figures 10A, 10B:
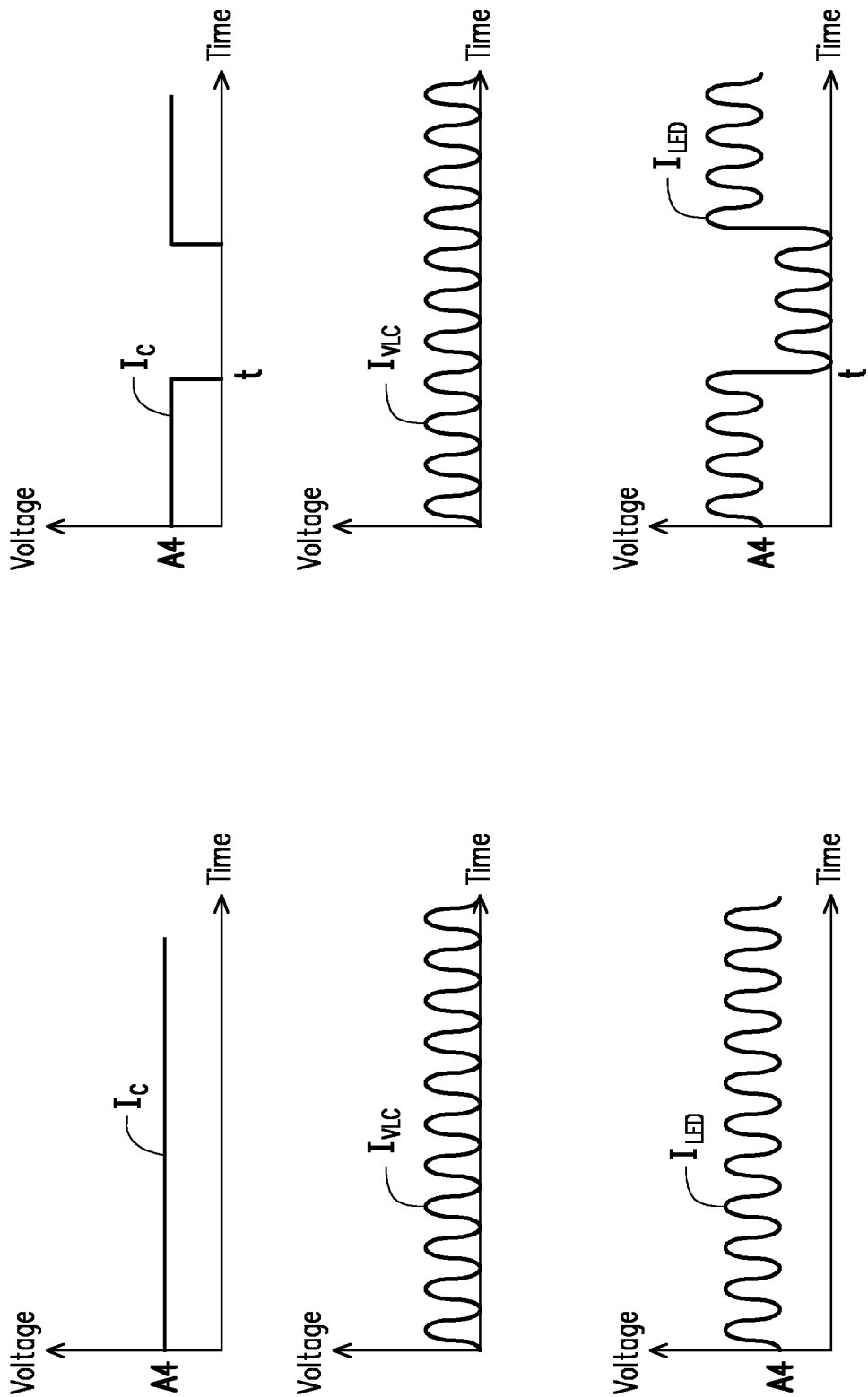
FIG. 10A and FIG. 10B are schematic diagrams illustrating signals according to an exemplary embodiment of the disclosure.

FIG. 10A and FIG. 10B are schematic diagrams illustrating signals according to an exemplary embodiment of the disclosure. With reference to FIG. 10A, the base current $I_C$ is a direct current (equal to a current value A4), and the adjustment current $I_{VLC}$ is a current having a periodic sinusoidal wave. The base current $I_C$ can be combined with the adjustment current $I_{VLC}$, so that the combined load current $I_{LED}$ is a current having a periodic sinusoidal wave. Further, the current value of the load current $I_{LED}$ may be equal to the current value of the base current $I_C$ plus the current value of the adjustment current $I_{VLC}$. With reference to FIG. 10B, the base current $I_C$ is a current having a periodic square wave (the current value of the base current $I_C$ varies between A4 and 0, and the half period of the base current $I_C$ is t), and the adjustment current $I_{VLC}$ is a current having a periodic sinusoidal wave. The base current $I_C$ is combined with the adjustment current $I_{VLC}$, so that the combined load current $I_{LED}$ is a current having a periodic sinusoidal wave and has a peak value which changes according to the base current $I_C$. Further, the current value of the load current $I_{LED}$ may be equal to the current value of the base current $I_C$ plus the current value of the adjustment current $I_{VLC}$.

In this embodiment, the base current $I_C$ does not affect the adjustment current $I_{VLC}$ obtained through the light signal, and the adjustment current $I_{VLC}$ features a high frequency bandwidth. For instance, the base current $I_C$ is a current with relatively low frequency, and the adjustment current $I_{VLC}$ is a current with relatively high frequency. As such, the load current $I_{LED}$ generated by combining the base current $I_C$ with the adjustment current $I_{VLC}$ is a current having multiple frequencies. In this way, after the light signal generated according to the load current $I_{LED}$ is received, the obtained light signal may be captured through a bandpass filter, so as to obtain communication data generated according to the adjustment current $I_{VLC}$.

In view of the foregoing, the disclosure provides the second current source to generate the adjustment current according to the adjustment voltage and to adjust magnitude of a current flowing through the load through the adjustment current. In this way, a working speed of the driving device in the disclosure is not limited by a working speed of the first current source configured to generate a major driving current, and performance of a driving circuit is therefore effectively increased.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A driving device, coupled to a load, the driving device comprising:
   a first current source, providing a base current flowing out from the load to drive the load; and
   a second current source, generating an adjustment current flowing out from the load according to an adjustment voltage, enabling the adjustment current to adjust magnitude of a current flowing through the load,
   wherein the base current and the adjustment current respectively generated by the first current source and the second current source are split and flowing out of the load so that the magnitude of the current flowing through the load is equal to a magnitude of the base current plus a magnitude of the adjustment current, wherein the second current source comprises:

a first resistor;

a first operational amplifier, a negative input end of the first operational amplifier coupled to a reference grounding end through the first resistor, a positive input end of the first operational amplifier configured to receive the adjustment voltage; and a first transistor, a control end of the first transistor coupled to an output end of the first operational amplifier, a first end of the first transistor coupled to a second end of the load, a second end of the first transistor coupled to the negative input end of the first operational amplifier.

2. The driving device as claimed in claim 1, wherein a first end of the load receives a reference voltage, and the second end of the load is coupled to the first current source and the second current source.

3. The driving device as claimed in claim 1, wherein the first current source comprises:

a second resistor;

a second operational amplifier, a negative input end of the second operational amplifier coupled to a reference grounding end through the second resistor, a positive input end of the second operational amplifier configured to receive a bias voltage; and a second transistor, a control end of the second transistor coupled to an output end of the second operational amplifier, a first end of the second transistor coupled to the second end of the load, a second end of the second transistor coupled to the negative input end of the second operational amplifier.

4. The driving device as claimed in claim 1, wherein the adjustment voltage is a pulse modulation signal, a sinusoidal wave signal, or a triangular wave signal, wherein the base current is a direct current or a current which varies periodically.

5. The driving device as claimed in claim 1, wherein a switching frequency of the base current is lower than a switching frequency of the adjustment voltage when the base current is a current which varies periodically.

6. A light source device, comprising:

a light-emitting element; and the driving device as claimed in claim 1, coupled to the light-emitting element.

* * * * *